United States Patent [19]

Lugscheider et al.

[11] Patent Number: 4,518,419
[45] Date of Patent: May 21, 1985

[54] METHOD OF CARRYING OUT METALLURGICAL OR CHEMICAL PROCESSES IN A SHAFT FURNACE, AND A LOW SHAFT FURNACE THEREFOR

[75] Inventors: Walter Lugscheider, Linz; Ernst Riegler, Enns; Ernst Zajicek, Ottensheim, all of Austria

[73] Assignees: SKW Trostberg Aktiengesellschaft, Trostberg, Fed. Rep. of Germany; Voest-Alpine Aktiengesellschaft, Linz, Austria

[21] Appl. No.: 563,308

[22] Filed: Dec. 20, 1983

[30] Foreign Application Priority Data

Dec. 22, 1982 [AT] Austria .................................. 4638/82
Oct. 28, 1983 [AT] Austria .................................. 3833/83

[51] Int. Cl.³ .............................................. C21C 5/52
[52] U.S. Cl. ...................................... 75/11; 75/10 R; 75/12
[58] Field of Search ........................... 75/11, 10 R, 12

[56] References Cited

U.S. PATENT DOCUMENTS 3,380,904  4/1968  Goldberger ..................... 204/164
3,404,078  10/1968 Goldberger ..................... 75/10 R
3,917,479  11/1975 Sayce ............................. 75/10 R
4,080,195  3/1978  Widell ............................. 75/11
4,394,162  7/1983  Tylko .............................. 75/11

Primary Examiner—Peter D. Rosenberg
Attorney, Agent, or Firm—Brumbaugh, Graves, Donohue & Raymond

[57] ABSTRACT

In a method of carrying out metallurgical or chemical processes in a shaft furnace having an upper cover, electric energy is supplied by a plasma burner penetrating the upper cover. A plasma torch is formed between the plasma burner and a counter-electrode penetrating the bottom of the shaft furnace. Charging stock is introduced concentrically about the plasma torch and forms a protective wall at the inner wall of the furnace. There is also provided an arrangement for carrying out this method.

17 Claims, 4 Drawing Figures

METHOD OF CARRYING OUT METALLURGICAL OR CHEMICAL PROCESSES IN A SHAFT FURNACE, AND A LOW SHAFT FURNACE THEREFOR

BACKGROUND OF THE INVENTION

The invention relates to a method for carrying out metallurgical or chemical processes in a shaft furnace by supplying electric energy by means of a plasma burner means penetrating the upper cover of the shaft furnace.

With known methods of this kind, or with conventional plasma melting furnaces, quite generally there exists the problem that the energy delivered by a plasma torch cannot be transmitted to the charging stock with satisfactory efficiency. When using diatomic plasma gases, the temperatures prevailing at the core of a plasma torch are around 15,000° C., and when using monoatomic plasma gases the temperatures are up to 30,000° C. Thus, a large part of the energy is given off by radiation. A substantial part of this radiation cannot be used for the high-temperature process or melting process, which furthermore also leads to a substantial thermal wear of the furnace lining.

Attempts have already been made at better utilizing the energy introduced by a plasma discharge by enlarging the cross-section of the discharge area. Thus, from U.S. Pat. No. 3,404,078, a method of producing a plasma arc is known, in which one of the electrodes is constituted by a fluidized bed of electrically conductive particles. Various materials may be introduced into the plasma region; the products resulting in the high temperature zone get into the fluidized bed and are cooled there. The method according to this U.S. patent thus is not suited for obtaining products in the molten state.

The invention aims at avoiding the difficulties described and has as its object to provide a method that is suited both for carrying out metallurgical processes and for chemical high-temperature reactions, in which a rapid melting and a quick reaction between the components of the charging stock is attained and in which the continuation of the method can be controlled in an improved manner.

SUMMARY OF THE INVENTION

According to the present invention, this object is achieved with a method of the initially defined kind in that a plasma torch is formed between a centrally arranged electrode penetrating the upper cover of the shaft furnace, and a counter-electrode penetrating the bottom of the shaft furnace, and that the charging stock is introduced concentrically about the torch, wherein a protective wall of solid charging stock components is piled up at the inner wall of the furnace and the charging stock enters into the region of the plasma torch from the inner side of the protective wall.

The particles of the charging stock introduced concentrically about the torch region protect the inner wall, i.e., the refractory lining of the shaft furnace, from thermal wear. A particular advantage of the mode of operation of the present invention is that the charging stock supplied, which surrounds the torch region like a curtain, absorbs more energy than is the case with conventional methods, whereby the speed of the metallurgical or chemical processes is substantially increased.

The particles of the charging stock falling down in a curtain-like manner, and the charging stock piled up concentrically about the torch region in the lower region of the furnace, absorb most of the heat radiation and are thereby preheated, thus resulting in an optimum utilization of the energy introduced in the form of an electric current.

The method of the present invention may be utilized advantageously for instance when producing ferroalloys, calcium-silicon, pig iron, as well as for build-up melting high-alloyed steel qualities and remelting scrap of the same kind as the steel to be produced. It is, however, also excellently suited for carrying out chemical processes running at high temperatures, such as the production of calcium carbide.

Due to the very low metal melting loss occurring in the speeded up metallurgical processes in the inert gas or reducing atmosphere which builds up, the method according to the present invention furthermore is characterized by a high yield of alloying elements as compared to conventional melting processes, such as electric arc melting.

For producing calcium carbide, a burden mixture of CaO or $CaCO_3$ and coal is melted according to the known technique and reduced under release of CO, wherein the electric energy is supplied via graphite or Soderberg electrodes having a large diameter. Herein, no electric arc forms, but the heating takes place substantially by resistance heating of the burden. Accordingly, temperatures attainable in the melting region are relatively low, and melting takes an accordingly long time.

In U.S. Pat. No. 3,404,078, already mentioned, for the production of $CaC_2$, it is suggested to provide a fluidized bed of graphite particles by using argon as carrier gas and to blow CaO with argon into the plasma discharge produced between this fluidized bed and the negative electrode. Graphite particles having a $CaCO_2$-coating are obtained, wherein only a 24.6 percent conversion is achieved.

According to a preferrec embodiment of the present invention, at the beginning of the metallurgical or chemical process a slight amount of the charging stock may be introduced into the region of the counter electrode, and after ignition of the plasma torch, further charging stock may be introduced continuously. If the layer were too high, the charging material that is still solid, would impede the forming of the plasma torch; it is, however, sufficiently electrically conductive that a small amount thereof enables the plasma torch to be ignited.

Suitably, the charging stock is continuously introduced through a ring of charging pipes surrounding the electrode or by an annular charging slot surrounding the electrode. Six to twelve charging pipes, e.g., may be provided.

If the charging stock is introduced through an annular charging slot surrounding the electrode, there results a particularly dense and uniform curtain of charging stock particles.

Preferably, charging stock having a grain size of up to 25 mm is used. With lumpy stock, grain sizes of up to 10 mm, and when using pellets, pellets of from 5 to 15 mm, are particularly preferred. As plasma gases, all gases commonly used for this purpose, such as Ar, He, $H_2$, $N_2$ and CO, may be used.

Beside the supply of charging stock through the charging openings, fine-particle components of the charging stock may also be supplied through interior channels of the electrode.

For producing ferro-alloys from oxidic ores and carbonaceous material, a mixture of the respective ores, in which the alloying elements and the iron are present in oxidic form mainly, as well as of coal or coke, is used as charging stock.

For producing calcium carbide by reducing CaO or $CaCO_3$ with carbonaceous material under release of CO and by melting, a burden mixture of CaO or $CaCO_3$ and of coal or coke is used as charging stock.

With the plasma torch, also with these reductive processes charging materials of various grain sizes, even dustlike charging materials, can be melted troublefree and brought to reaction, while hitherto—particularly with the initially described production of $CaC_2$ by resistance heating—only lumpy charging materials could be used.

With the method according to the invention, not only the radiation heat of the plasma torch, but also the convection heat (in the spot of impact of the torch on the charging stock that is either still solid or already melted) is utilized and combined with the resistance heating resulting from the current flow through the remaining charging stock or the remaining burden. The carbon monoxide forming during the reaction increases the energy density of the plasma torch and thus causes a further increase in the energy yield.

The invention furthermore comprises a low-shaft furnace for carrying out the method according to the invention—in particular for carrying out reductive processes, such as the production of ferroalloys and calcium carbide. The furnace has a refractorily lined furnace body and a guide for the plasma burner means inserted in the furnace body, an annular space being provided between the guide and the refractory lining for supplying the charging stock or burden. According to the invention, there is provided an upper cover to be placeable on to the furnace body in a gas-tight manner, which cover has an inwardly projecting column of refractory material, the column comprising a central bore through which an electrode can be guided, and a water-cooling means. A counter-electrode is provided in the bottom of the shaft furnace for forming the plasma torch. A frusto-conical space is left free between the mouth of the electrode (of the plasma burner), the bottom electrode and the inner side of the protective wall of solid charging stock components.

Advantageously, the walls of the annular space or shaft accommodating the charging stock, which walls are formed by the refractory lining and by the column, are designed so as to diverge outwardly near the bottom of the furnace.

The electrode of the plasma burner means, which electrode is guided through the central bore of the column of refractory material, according to an advantageous embodiment is provided with inner channels for supplying fine-particle charging stock components, in particular coal.

BRIEF DESCRIPTION OF THE DRAWINGS

The invention will now be explained in more detail with reference to the accompanying and to the examples, wherein.

DESCRIPTION OF EXEMPLARY EMBODIMENTS

Figure 1:
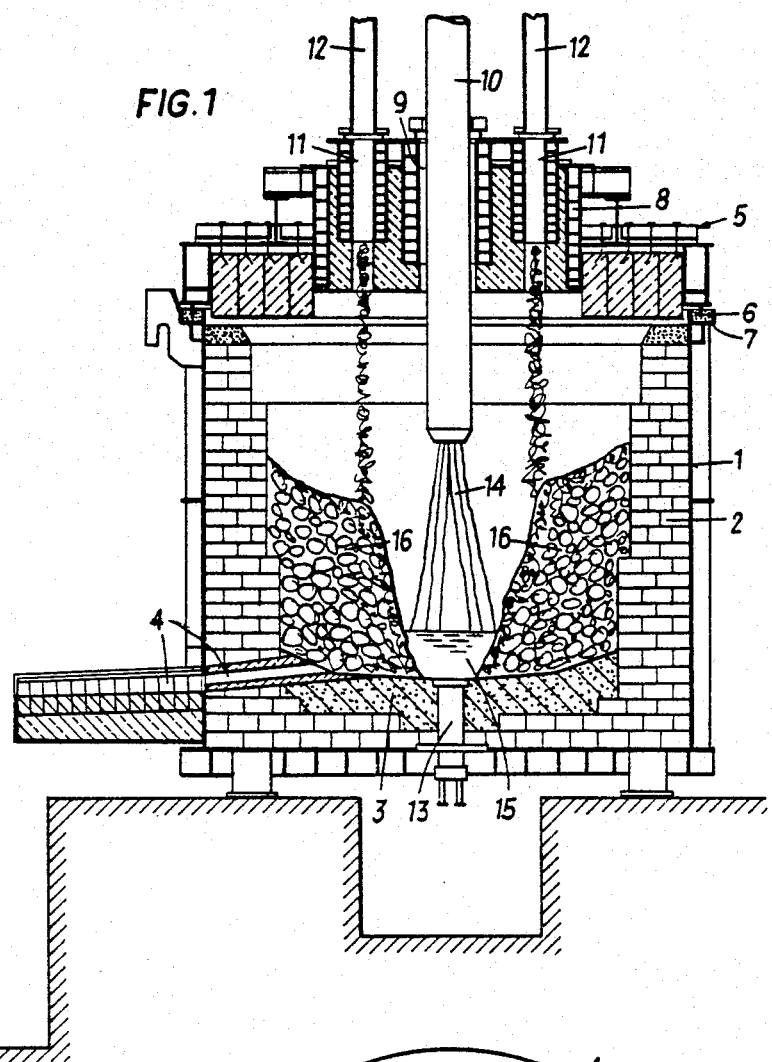
FIG. 1 shows a vertical section through a low-shaft furnace.
Figure 2:
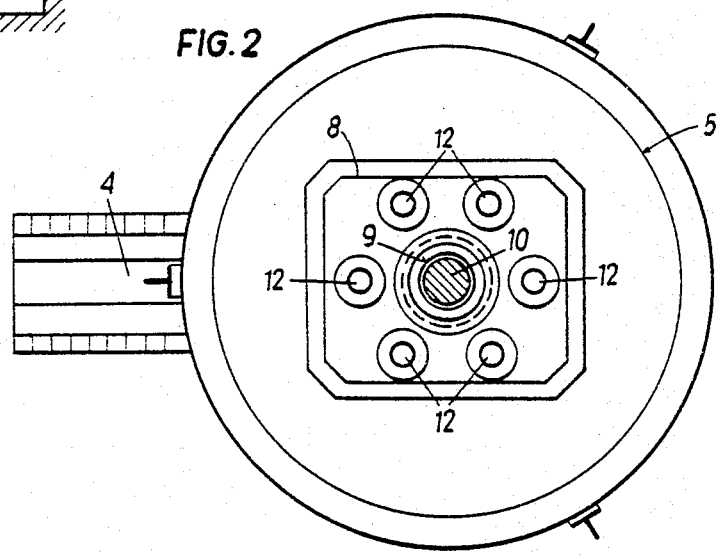
FIG. 2 is a top view of the furnace illustrated in FIG. 1.

FIG. 1, the shell 1 of the shaft furnace has a lining of refractory bricks 2. The bottom of the shaft furnace is rammed of a graphite mass 3, and in the bottom a lateral pouring spout 4 is provided. On the shaft furnace there rests an upper cover 5 which closes the furnace interior in a gas-tight manner by means of a cover projection 6 which engages in a sand channel 7 extending all around. The core piece 8 of the cover is provided with a water cooling, and has a number of bores (FIG. 2), i.e., one central water-cooled bore 9, through which the plasma burner or the electrode 10 is guided, and a ring of six further bores 11 surrounding the central bore, through which the charging pipes 12 for introducing the charging stock or the burden components are guided. In the bottom of the shaft furnace, opposite the mouth of the plasma burner 10, a counter-electrode 13 is arranged.

At the beginning of the process, a slight amount of charging stock is introduced through the charging pipes 12; then the discharge is initiated, a freely burning plasma torch 14 forming thereby, and a sump 15 of molten charging stock is formed, the process thus being started. Then further charging stock is continuously introduced, a protective wall 16 of solid charging stock components being piled up around the sump 15 at the inner wall 2 of the furnace, which protective wall protects the refractory lining from exceedingly high temperatures and which simultaneously is pre-heated by the radiation heat of the plasma torch 14.

Figure 3:
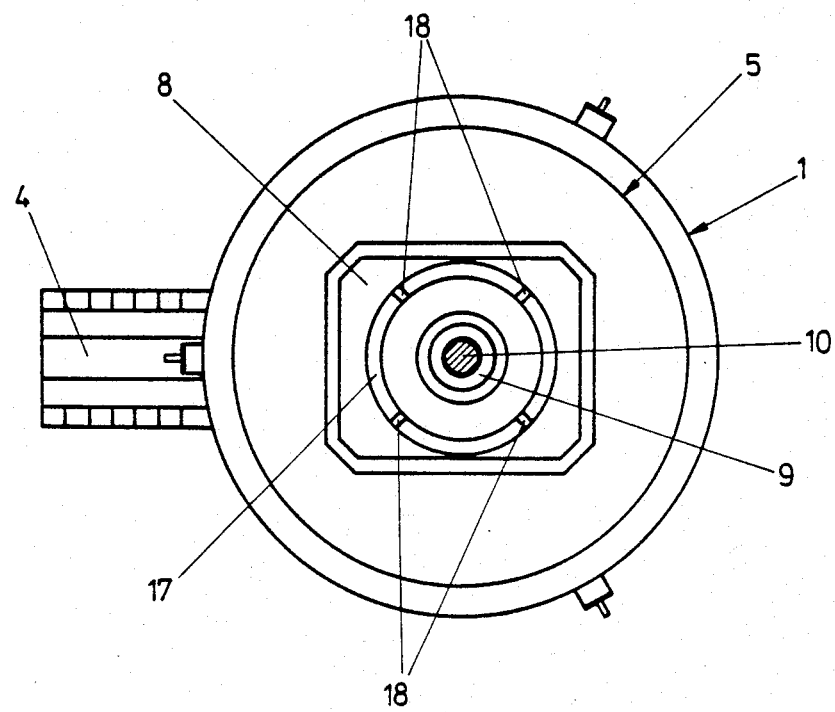
FIG. 3 is a top view onto the furnace with an alternative design of the charging opening.

In FIG. 3, the furnace shell again is denoted by 1, and on to the furnace shell an upper cover 5 is put in a gas-tight manner. Furthermore, the pouring spout 4 laterally leading away from the bottom part of the furnace is visible. In the water-cooled core piece 8 of the cover 5, a central bore 9 is provided, through which a plasma burner 10 is guided. An annular charging slot 17 surrounds the bore 9 concentrically. In the charging slot 17 there are provided four spacers 18 which also contain channels for the cooling water.

If the charging stock is continuously introduced into the shaft furnace through the slot 17, the particles of the charging stock form a dense curtain about the region of the plasma torch burning between the electrode in the burner 10 and the counter electrode 13 penetrating the bottom of the shaft furnace. The particle curtain protects the furnace brick-work from thermal load and absorbs the largest part of the thermal energy radiated off by the plasma torch so that a considerable amount of the charging stock reaches the bottom of the shaft furnace and the melt sump in an already liquid state. The larger particles which have not melted then contribute to the piling up of the protective wall 16.

Figure 4:
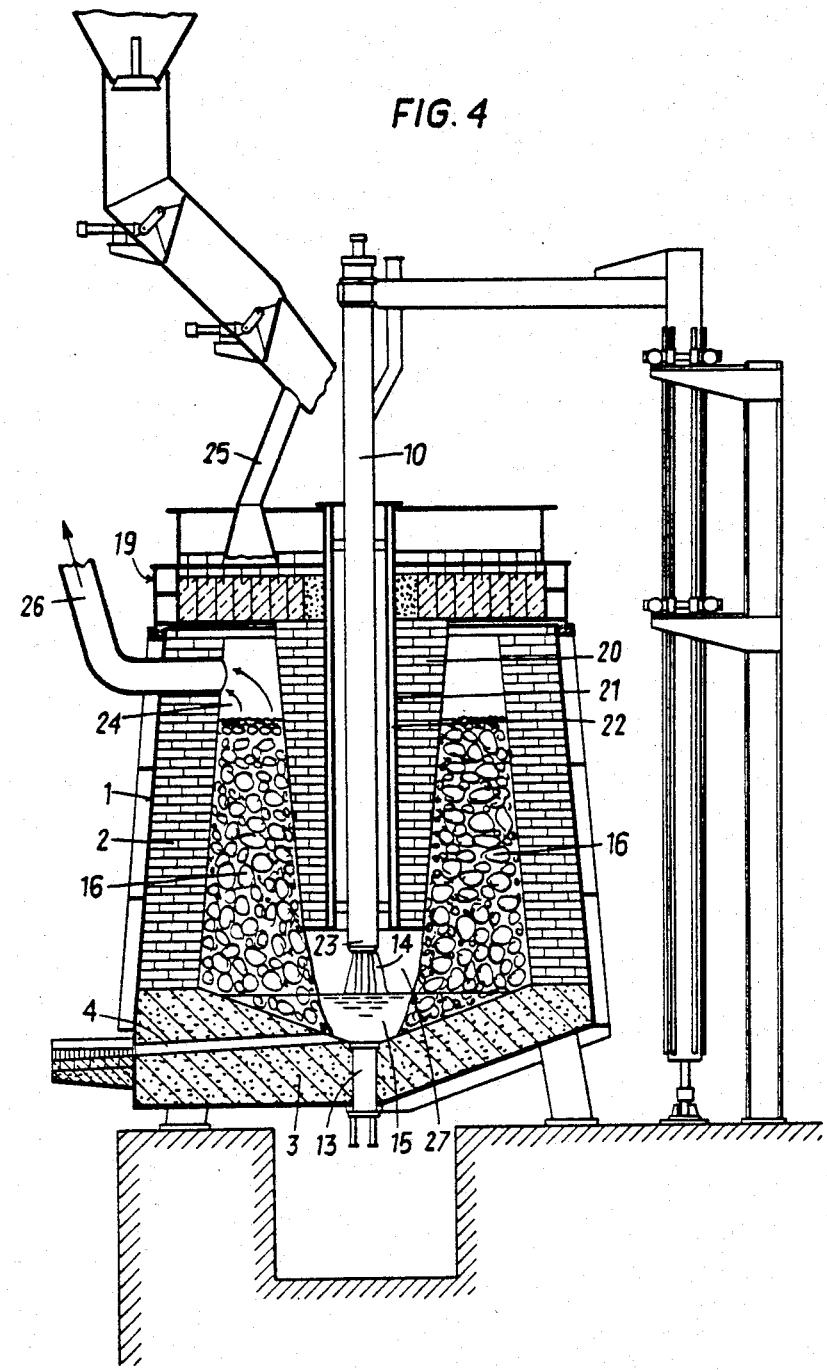
FIG. 4 is a modified embodiment of a low-shaft furnace which is particularly suitable for carrying out the reductive processes mentioned.

Also with the embodiment according to FIG. 4, the shell of the vessel is denoted by 1 and the refractory lining by 2. The bottom of the furnace is formed by a graphite ramming mass 3, which bottom has a lateral outlet channel or pouring spout 4 for molten material. Onto the mouth of the shaft furnace (the upper diameter of which is less than its lower diameter, i.e., the furnace walls diverge towards the bottom), a water-cooled upper cover 19 is put placed, which cover 19 is provided with a columnlike guide 20 towards the furnace interior, which guide consists of refractory material. The frusto-conical column has a central bore 21 provided with a water-cooling 22. Through the bore, the plasma burner 10 is guided, which, with its mouth 23 extends to beyond the lower end of the column 20. By the frusto-conical design of the guiding column and the conical shape of the refractory lining 2 of the inner walls of the shaft furnace, an annular, downwardly diverging space 24 is formed, in which solid charging stock or burden components having the function of the protective wall 16 are stored, which are introduced through a supply chute 25 penetrating the cover 19 and provided with dosing flaps. By 26 a vent pipe for the gas freed during the reduction process is denoted.

Between the bottom electrode 13 and the mouth 23 of the plasma burner or electrode 10—as can be seen—there remains free a frusto-conical, downwardly converging space 27. In this space, the plasma torch 14 is ignited at the start of the process, after a slight amount of charging stock or burden has been introduced; thereupon, the annular space 24 is filled to slightly below the vent pipe 26 with burden components by supplying further burden.

When the reduction process continues, burden components are continuously melted and reacted in the free space 27; the gas forming, in particular CO, rises through the burden layer or protective wall 16 and causes a pre-heating and pre-reducing.

According to a preferred embodiment of producing ferro-alloys or calcium carbide, fine-particle coal may additionally be introduced into the space 27 through one or more inner channels of the plasma burner during the process, with CO forming additionally.

Beside the embodiments described—as will be understood by the skilled artisan—shaft furnaces having a plurality of plasma burners each producing a plasma torch may be used.

EXAMPLE 1: Production of ferro-manganese 1,300 kg of ferro-manganese ores (with 45 to 55% Mn, up to 10% Fe, Mn and Fe being present mainly in the form of oxides)—mixed with 400 to 500 kg of coal, coke or small coal—are continuously charged at a speed of approximately 1.5–3 kg/s. After about 10 to 20 min, approximately 1 t of ferro-manganese with 75% of Mn, 2% of oxides, balance iron, has been produced.

In the following Examples 2 and 3, 1 to 5 kg, preferably 3 kg, of charging stock per s are continuously introduced; the production amounts to 3 to 15 t per h.

With a shaft furnace, the furnace size is restricted by the highest performance of the burner possible; such a furnace with a conventional burner allows for a production of about 5 t of product/h.

EXAMPLE 2: Melting of CrNiMoNb-steel of scrap of the same kind 5,000 kg of shredder scrap of the following composition: 0.049% C, 0.21% Si, 1.26% Mn, 0.017% P, 0.031% S, 18.8% Cr, 11.03% Ni, 2.2% Mo, 0.11% Cu, 0.60% Nb; are charged together with 32.6 kg of FeMo (59.7% Mo), 21.7 kg of pure-Ni (99.0%), 83.3 kg of FeCr (0.033% C, 73.1% Cr) and 16.3 kg of FeNbTa (60.7% Nb).

A total of 5,072 kg of steel of the composition: 0.055% C, 0.32% Si, 1.22% Mn, 0.023% P, 0.011% S, 19.22% Cr, 11.15% Ni, 2.5% Mo, 0.11% Cu, 0.75% Nb is obtained. With a total metal melting loss of 2%, there results the following degree of yield of the respective alloying elements:

99% Ni, 97% Cr, 98% Mo, 98% Mn, 96% Nb.

EXAMPLE 3: Production of steel of the type X5CrNiMoNb 19 11 by build-up melting 5,000 kg of iron sponge, 934 kg of pure-Ni, 350 kg of FeMo (56% Mo), 2,205 kg of FeCr (0.036% C, 73.8% Cr), 108 kg of Mn-metal (99%) and 87 kg of FeNbTa (60.7% Nb) are charged into the furnace.

The yield is 8,458 kg of steel of the composition: 0.041% C, 0.35% Si, 1.27% Mn, 0.016% P, 0.01% S, 18.57% Cr, 10.95% Ni, 2.29% Mo, 0.11% Cu, 0.63% Nb.

The total metal melting loss lies at 3%. The degree of yield of the respective alloying elements thus amounts to:

99% Ni, 99% Cr, 99% Mo, 99% Mn, 100% Nb.

EXAMPLE 4: Production of calcium carbide

A burden mixture of 3,000 kg of burnt lime and 1,950 kg of coal with a discontinuous grain size distribution up to maximally 25 mm was continuously introduced into a shaft furnace of the embodiment illustrated in FIG. 4 with a charging speed of 3 kg/s, after at first a slight amount of burden had been supplied to the region of the counter-electrode penetrating the bottom of the shaft furnace and the plasma torch had been ignited. As plasma gas, argon was used. The calcium carbide yielded had a degree of purity of 90.2%.

It was found that, with the method according to the invention, the utilization of the electric energy consumed quite generally was better by approximately 20% than with known melting and reduction processes.

What we claim is:

1. In a method of carrying out metallurgical processes, chemical processes and the like in a shaft furnace having an upper cover, an inner wall and a bottom, by supplying electric energy of a plasma burner means penetrating said upper cover, the improvement comprising
forming a plasma torch region in said shaft furnace by forming a plasma torch between an electrode penetrating said upper cover at about its center and a counter-electrode penetrating said bottom of said shaft furnace,
introducing charging stock concentrically about said plasma torch so as to form a protective wall, having an inner side, of solid charging stock components piled up on said bottom of said furnace at said inner wall of said furnace and surrounding said plasma torch region, and
processing said solid charging stock from said inner side of said protective wall which is exposed to said plasma torch region.

2. A method as set forth in claim 1, wherein a slight amount of charging stock is introduced into the counter-electrode region at the beginning of the metallurgical or chemical process, and after ignition of the plasma torch, further charging stock is continuously introduced.

3. A method as set forth in claim 1 or 2, wherein a ring of charging pipes surrounding said centrally arranged electrode is provided and said charging stock is continuously introduced through said ring of charging pipes.

4. A method as set forth in claim 1 or 2, wherein an annular charging slot surrounding said centrally arranged electrode is provided and said charging stock is continuously introduced through said annular charging slot.

5. A method as set forth in claim 1, wherein charging stock having a grain size of up to 25 mm is used.

6. A method as set forth in claim 1, wherein said centrally arranged electrode is provided with inner channels and fine-particle components of the charging stock are supplied through said inner channels of said centrally arranged electrode.

7. A method as set forth in claim 1, for producing ferro-alloys from oxidic ores containing alloying elements and iron and from carbonaceous material wherein said carbonaceous material is selected from the group consisting of coal and coke, and wherein as said charging stock a mixture of the respective ores containing said alloying elements and said iron substantially in oxidic form and of said carbonaceous material is used.

8. A method as set forth in claim 1 for producing calcium carbide by reducing at least one of CaO and $CaCO_3$ with a carbonaceous material under release of CO and by melting, wherein said carbonaceous material is selected from the group consisting of coal and coke, and wherein as said charging stock a mixture of said carbonaceous material and at least one of CaO and $CaCO_3$ is used.

9. In a low shaft furnace for carrying out reductive processes and of the type including
   a furnace body having an inner wall provided with a refractory lining and having a bottom, thereby defining an inner space,
   a plasma burner means,
   a guide means for said plasma burner means inserted in said furnace body, and
   an annular space provided between said guide means and sdid refractory lining for accommodating charging stock, the improvement wherein said furnace further comprises
   an upper cover placeable on said furnace body in a gas-tight manner, said upper cover having a column of refractory material projecting therefrom into said inner space of said furnace body, said column being provided with water-cooling means,
   a plasma burner means comprising an electrode having an electrode mouth, said guide means for said plasma burner means comprising a central bore in said column through which said electrode is adapted to be guided, and
   a counter-electrode provided in said bottom of said furnace, whereby in operation a protective wall of solid charging stock components having an inner side is piled up on said bottom of said furnace at said inner wall of said furnace body thereby defining a frusto-conical space left free between said electrode mouth, said counter-electrode and said inner side of said protective wall in which frusto-conical space a plasma torch is formed.

10. A low-shaft furnace as set forth in claim 9, wherein said reductive process is a process for producing ferro-alloys from oxidic ores containing alloying elements and iron and from carbonaceous material, selected from the group consisting of coal and coke, the charging stock being a mixture of the respective ores containing the alloying elements and the iron substantially in oxidic form and of said carbonaceous material.

11. A low-shaft furnace as set forth in claim 9, wherein said reductive process is a process for producing calcium-carbide by reduction of at least one of CaO and $CaCO_3$ with a carbonaceous material selected from the group consisting of coal and coke, under release of CO and by melting, the charging stock being a mixture of said carbonaceous material and of at least one of CaO and $CaCO_3$.

12. A low-shaft furnace as set forth in claim 9, wherein said annular space accommodating said charging stock is defined by walls formed by said refractory lining of said furnace body and by said column, said walls being designed so as to diverge towards the bottom of the furnace.

13. A low-shaft furnace as set forth in claim 9, further comprising inner channels provided in said electrode for supplying fine-particle charging stock components.

14. A low-shaft furnace as set forth in claim 13, wherein said fine-particle charging stock components are comprised of coal.

15. A low-shaft furnace as set forth in claim 9, wherein a ring of charging pipes is provided in said upper cover surrounding said centrally arranged electrode.

16. A low-shaft furnace as set forth in claim 9, wherein an annular charging slot is provided in said upper cover surrounding said centrally arranged electrode.

17. A low-shaft furnace as set forth in claim 9, wherein said centrally arranged electrode includes inner channels through which fine-particle components of said charging stock are supplied.

* * * * *